United States Patent
Sato et al.

[19]

[11] Patent Number: 6,116,218
[45] Date of Patent: Sep. 12, 2000

[54] FUEL INJECTOR FIXING DEVICE FOR DIRECT INJECTION ENGINE

[75] Inventors: Tatsuo Sato; Masahito Shiraki, both of Kanagawa-ken, Japan

[73] Assignee: Nissan Motor Co., Ltd., Kanagawa-ken, Japan

[21] Appl. No.: 09/068,226
[22] PCT Filed: Sep. 2, 1997
[86] PCT No.: PCT/JP97/03066
 § 371 Date: May 5, 1998
 § 102(e) Date: May 5, 1998
[87] PCT Pub. No.: WO98/10188
 PCT Pub. Date: Mar. 12, 1998

[30] Foreign Application Priority Data

Sep. 6, 1996 [JP] Japan ................................. 8-236924

[51] Int. Cl.[7] ................................................. F02M 55/02
[52] U.S. Cl. ............................................. 123/470; 123/509
[58] Field of Search .................................. 123/470, 469, 123/468, 472, 456, 509

[56] References Cited

U.S. PATENT DOCUMENTS

| 3,945,353 | 3/1976 | Dreisin . | |
|---|---|---|---|
| 4,403,586 | 9/1983 | Taniguchi | 123/509 |
| 4,539,964 | 9/1985 | Djordjevic | 123/509 |
| 4,571,161 | 2/1986 | Leblanc | 123/509 |
| 5,499,612 | 3/1996 | Haughney | 123/509 |
| 5,697,345 | 12/1997 | Genter | 123/509 |

FOREIGN PATENT DOCUMENTS

| 0 724 075 | 7/1996 | European Pat. Off. . |
| 195 21 363 | 9/1996 | Germany . |
| 60-57775 | 4/1985 | Japan . |
| 4-76208 | 3/1992 | Japan . |
| 4-43242 | 4/1992 | Japan . |
| 6-221248 | 8/1994 | Japan . |
| 6-69360 | 9/1994 | Japan . |

*Primary Examiner*—Carl S. Miller
*Attorney, Agent, or Firm*—McDermott, Will & Emery

[57] ABSTRACT

A fuel injector fixing device for fixing a fuel injector 13 to a cylinder head 11 of a direct injection engine is provided. The fuel injector fixing device includes a spacer 17 arranged so as to project from a top face of the cylinder head 11 upwardly, a stud bolt 15 screwed into the cylinder head 11 and an injector push arm 14 arranged above the cylinder head 11 for fixing the fuel injector 13 to the cylinder head 11. In arrangement, the injector push arm 14 includes a pusher part 14A abutting on the fuel injector 13, a support part 14B abutting on a top of the spacer 17, and an attachment part 14C with a through hole 14a into which the stud bolt 15 is inserted and screwed into the cylinder head 11. In operation, a contact of the support part 14B of the injector push arm 14 with the spacer 17 constitutes a fulcrum X of the injector push arm 14. With the arrangement, it is possible to decrease a distance between the attachment part 14C and the support part 14B, whereby the whole length of the injector push arm 14 can be shortened. Thus, the rigidity of the injector push arm can be enhanced. Further, owing to the heightened position of the fulcrum X, it is possible to reduce a possibility of the injector push arm's tumbling down to the side of the support part 14B in fastening the stud bolt 15.

26 Claims, 5 Drawing Sheets

FUEL INJECTOR FIXING DEVICE FOR DIRECT INJECTION ENGINE

TECHNICAL FIELD

The present invention relates to a direct injection engine. More particularly, it relates to a device for fixing a fuel injector on a cylinder head.

BACKGROUND ART

There is known a direct injection gasoline as well as Diesel engine in which each of the fuel injectors is disposed in the substantial center of four intake and exhaust ports of the cylinder head.

In this direct injection engine, each of the fuel injectors is inserted into each attachment hole formed in the cylinder head.

The fuel injector inserted in the cylinder head in this way is then fixed to the cylinder head by an injector push arm arranged at the top of the cylinder head (see Japanese Unexamined Utility Model Publication (kokai) No. 6-69360 and 60-57775, Japanese Unexamined Patent Publication (kokai) No. 4-76208, the same 6-221248, and Japanese Unexamined Utility Model Publication (kokai) No. 4-43242).

One example of conventional devices, as disclosed in the Japanese Unexamined Utility Model Publication No. 60-57775, for fixing the fuel injectors to the cylinder head by the injector push arms will be explained hereinafter. The injector push arm is provided, at a leading end thereof, with a pusher part which comes into contact with an end of the fuel injector opposite to a fuel injection nozzle. At the rear end of the injector push arm, a support part is formed so as to abut on a head part of a cylinder head bolt. Between the pusher part and the support part of the injector push arm, an attachment part is provided with a through hole through which a stud bolt is screwed into a cylinder head.

Owing to the provision of the pusher part abutting on the fuel injector, the support part abutting on the head part of the cylinder head bolt and the attachment part fixed to the cylinder head through the stud bolt, the injector push arm serves to fix the fuel injector to the cylinder head. In this fixing arrangement, a contact between the head part of the cylinder head bolt and the support part constitutes a fulcrum of the injector push arm.

The inventor of the present invention has recognized disadvantages with the prior art arrangements, especially when these are applied to an over-head camshaft (OHC) engine.

DISCLOSURE OF THE INVENTION

In case of the OHC (over-head camshaft) engine where camshafts are positioned above the cylinder head, the injector push arm has to be arranged so as to extend or over at least one camshaft. Such an arrangement causes a contact point of the pusher part of the injector push arm with the fuel injector to be elevated. Consequently, a distance between the attachment part and the support part is increased thereby to lengthen the whole length of the injector push arm.

Therefore, the lengthened injector push arm is apt to cause the rigidity to be reduced. Further, due to the low position of the fulcrum, the injector push arm is easy to tumble down to the side of the support part, so that a force of the pusher part applied on the fuel injector may be lowered.

It is therefore an object of the present invention to provide a fuel injector fixing device for a direct injection engine, which is capable of developing the pushing force of the push part onto the fuel injector.

The object of the present invention described above can be accomplished by a fuel injector fixing device for fixing a fuel injector having a fuel injection nozzle at a leading end thereof to a cylinder head of a direct injection engine, the fuel injector fixing device comprising:

a spacer arranged so as to project from a top face of the cylinder head upwardly;

a stud bolt screwed into the cylinder head; and an injector push arm arranged above the cylinder head for fixing the fuel injector to the cylinder head, the injector push arm consisting of a pusher part which is arranged at one end of the injector push arm so as to abut on one end of the fuel injector opposite to the fuel injection nozzle, a support part which is arranged at the other end of the injector push arm so as to abut on a top of the spacer, and an attachment part which is arranged between the pusher part and the support part, the attachment part being provided with a through hole into which the stud bolt is inserted and screwed into the cylinder head;

wherein a contact of the pusher part of the injector push arm with the fuel injector constitutes a working point of the injector push arm, while another contact of the support part of the injector push arm with the spacer constitutes a fulcrum of the injector push arm.

In the present invention, it is possible to decrease a distance between the attachment part and the support part, whereby the whole length of the injector push arm can be shortened. Thus, the rigidity of the injector push arm can be enhanced.

Further, owing to the heightened position of the fulcrum, it is possible to reduce a possibility of the injector push arm's tumbling down to the side of the support part in fastening the stud bolt.

In the present invention, preferably, the spacer is constituted by a separate member from the cylinder head and fastened to the cylinder head by way of a cylinder head bolt. In this case, the attachment rigidity of the injector push arm can be enhanced.

More preferably, the spacer comprises a fastening part which is arranged at one end of the spacer and into which the cylinder head bolt is inserted, and an abutment part which is arranged at the other end of the spacer and on which the support part of the injector abuts. In this case, the spacer can be fastened to the cylinder head with ease, while the abutment part engaging with the support part of the injector push arm can be formed with ease.

Alternatively, the spacer is constituted by a separate member from the cylinder head and then cast integral with the cylinder head. In this case, it is possible to make the fastening operation of the spacer unnecessary.

More preferably, the support part of the injector push arm has an abutment face abutting on the spacer, which is curved to provide a pivot. In this case, the displacement of the injector push arm, which may be caused during its fastening, can be allowed.

Preferably, the spacer is provided with a positioning pin which projects from the top of the spacer upwardly and which is inserted into a hole formed in the support part of the injector push arm. In this case, it is possible to carry out the positioning of the abutment part of the spacer and the support part of the injector push arm certainly.

In the present invention, preferably, the cylinder head is made of metal or alloy of aluminum-base, while a body of the fuel injector, the injector push arm, and the stud bolt are made of metal of iron-base, respectively.

More preferably, the direct injection engine is constituted by an overhead cam shaft engine having at least one camshaft and the injector push arm is arranged above the cylinder head so as to stride over the camshaft.

According to the invention, there is also provided a fuel injector fixing device for fixing a fuel injector having a fuel injection nozzle at a leading end thereof to a cylinder head of a direct injection engine, the fuel injector fixing device comprising:

a base part formed on an upper end of a sidewall portion of the cylinder head;

a fulcrum pin fitted in the base part so as to partially project from a top face of the base part;

a stud bolt screwed into the cylinder head; and an injector push arm arranged above the cylinder head for fixing the fuel injector to the cylinder head, the injector push arm consisting of a pusher part which is arranged at one end of the injector push arm so as to abut on one end of the fuel injector opposite to the fuel injection nozzle, a support part which is arranged at the other end of the injector push arm so as to abut on the fulcrum pin, and an attachment part which is arranged between the pusher part and the support part, the attachment part being provided with a through hole into which the stud bolt is inserted and screwed into the cylinder head;

wherein a contact of the fulcrum pin with the fuel injector constitutes a fulcrum of the injector push arm.

Also in the present invention, it is possible to decrease a distance between the attachment part and the support part, whereby the whole length of the injector push arm can be shortened. Thus, the rigidity of the injector push arm can be enhanced. Further, owing to the heightened position of the fulcrum, it is possible to reduce a possibility of the injector push arm's tumbling down to the side of the support part in fastening the stud bolt.

Furthermore, since the thermal expansion difference between the position of the fuel injector and the position of the stud bolt balances the thermal expansion difference between the position of the stud bolt and the position of the fulcrum, it is possible to prevent an occurrence of looseness at slacks of the condition where the fuel injector is held by the push part of the injector push arm.

In the present invention, preferably, the support part of the injector push arm and the fulcrum pin have respective abutment surfaces which come into contact with each other and which are in pivotal engagement. With the arrangement mentioned above, when fastening and fixing the injector push arm, it is possible to allow the pivotal movement of the injector push arm with respect to the fulcrum pin.

Also in the present invention, preferably, the cylinder head is made of metal or alloy of aluminum-base, while a body of the fuel injector, the injector push arm, and the stud bolt are made of metal of iron-base, respectively.

More preferably, the direct injection engine is constituted by an overhead cam shaft engine having at least one camshaft and the injector push arm is arranged above the cylinder head so as to stride over the camshaft.

Additionally, according to the invention, there is also provided a cylinder head assembly for a direct injection engine, comprising:

a cylinder head having a plurality of fuel injectors inserted thereinto, each of the fuel injectors having a fuel injection nozzle at a leading end thereof; and a plurality of fuel injector fixing devices for fixing the fuel injectors to the cylinder head;

wherein each of the fuel injector fixing device comprises:

a spacer arranged so as to project from a top face of the cylinder head upwardly;

a stud bolt screwed into the cylinder head; and an injector push arm arranged above the cylinder head for fixing the fuel injector to the cylinder head, the injector push arm consisting of a pusher part which is arranged at one end of the injector push arm so as to abut on one end of the fuel injector opposite to the fuel injection nozzle, a support part which is arranged at the other end of the injector push arm so as to abut on a top of the spacer, and an attachment part which is arranged between the pusher part and the support part, the attachment part being provided with a through hole into which the stud bolt is inserted and screwed into the cylinder head;

wherein a contact of the pusher part of the injector push arm with the fuel injector constitutes a working point of the injector push arm, while another contact of the support part of the injector push arm with the spacer constitutes a fulcrum of the injector push arm.

Furthermore, there is also provided a cylinder head assembly for a direct injection engine, comprising:

a cylinder head having a plurality of fuel injectors inserted thereinto, each of the fuel injectors having a fuel injection nozzle at a leading end thereof; and a plurality of fuel injector fixing devices for fixing the fuel injectors to the cylinder head;

wherein each of the fuel injector fixing device comprises:

a base part formed on an upper end of a sidewall portion of the cylinder head;

a fulcrum pin fitted in the base part so as to partially project from a top face of the base part;

a stud bolt screwed into the cylinder head; and an injector push arm arranged above the cylinder head for fixing the fuel injector to the cylinder head, the injector push arm consisting of a pusher part which is arranged at one end of the injector push arm so as to abut on one end of the fuel injector opposite to the fuel injection nozzle, a support part which is arranged at the other end of the injector push arm so as to abut on the fulcrum pin, and an attachment part which is arranged between the pusher part and the support part, the attachment part being provided with a through hole into which the stud bolt is inserted and screwed into the cylinder head;

wherein a contact of the fulcrum pin with the fuel injector constitutes a fulcrum of the injector push arm.

The above and other features and advantages of this invention will become apparent, and the invention itself will best be understood, from a study of the following description and appended claims, with reference had to the attached drawings showing a preferred embodiment of the invention.

BEST MODE FOR CARRYING OUT THE INVENTION

Embodiments of the present invention will be described with reference to the drawings.

Figure 1:
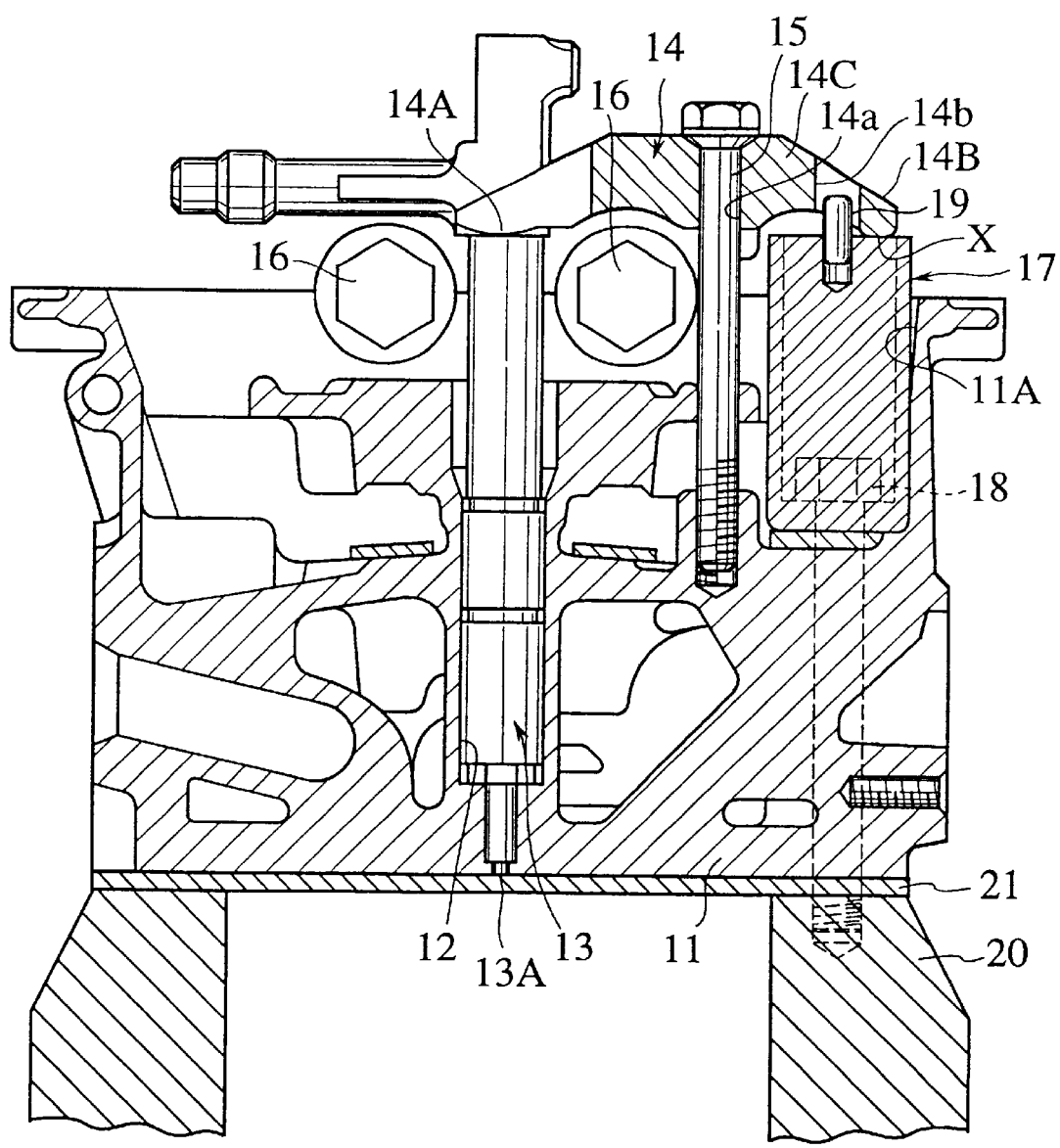
FIG. 1 is a longitudinal cross sectional view of an attachment part of a cylinder head for attachment with a fuel injector, taken along a line I—I of FIG. 2, in accordance with one embodiment of the present invention.
Figure 2:
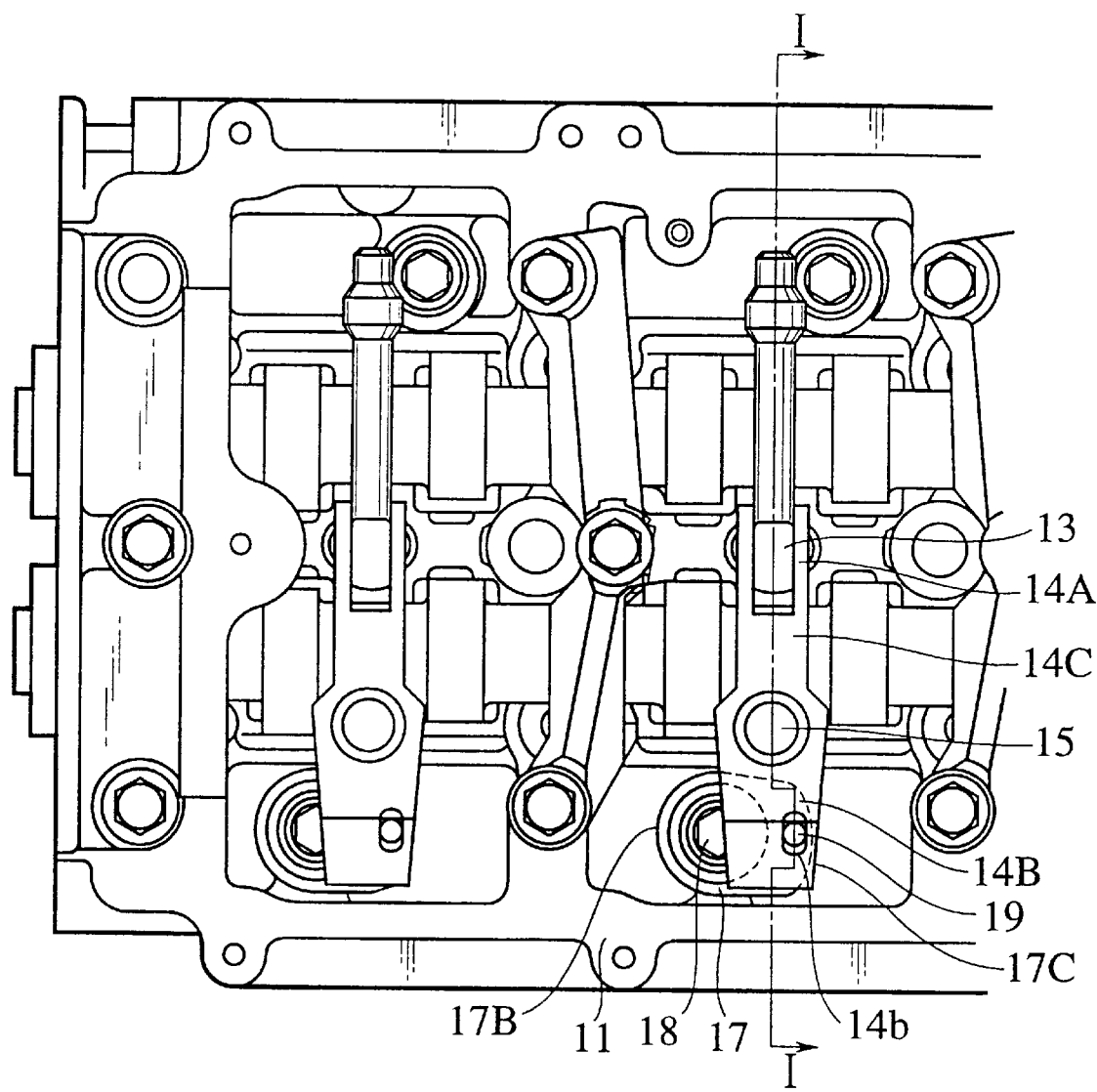
FIG. 2 is a plan view of the attachment part of FIG. 1.

In FIGS. 1 and 2, a cylinder head 11 of a multi-cylinder overhead camshaft (OHC) Diesel engine of direct injection type is provided. For each cylinder bore, two direct driven intake valves and two direct driven exhaust valves are provided both of which are not shown in the figures. The cylinder head 11 is made of aluminum base alloy and mounted on a cylinder block 20 by a head bolt 18 will a head gasket 21 interposed therebetween. The cylinder head 11 has not shown ports formed therein and opened and shut by the above four valves.

A fuel injector 13 is attached into an attachment hole 12 which is formed at a substantial center of the four ports formed in the cylinder head 11. Fuel injector 13 has a nozzle 13a exposed to a combustion chamber, which is defined by cylinder head 11, cylinder block 20 and a piston reciprocally received in cylinder bore (not shown).

In the direct injection type Diesel engine constructed above, the fuel injector 13 is fixed to cylinder head 11 by means of an injector push arm 14 arranged above the cylinder head 11.

The injector push arm 14 has a pusher part 14A arranged at one end thereof so as to abut on one end of the fuel injector 13 opposite to the fuel injection nozzle 13A, a support part 14B arranged at the other end of the injector push arm 14 so as to abut on a top of a spacer described later, and an attachment part 14C arranged between the pusher part 14A and the support part 14B. The attachment part 14C is provided with a through hole 14a into which a stud bolt 15 is inserted and screwed into the cylinder head 11.

The pusher part 14A is bifurcated to have a pair of extensions with a narrow lateral width. Further, the pusher part 14A has an abutment face in contact with the fuel injector 13, which is formed to be a curved surface.

The support part 14B and the attachment part 14C are respectively formed to have a large lateral width in comparison with that of the pusher part 14A.

Such an injector push arm 14 is arranged so as to stride over (viz., extend over in a bridge-like manner) the camshaft 16 above the cylinder head 11. A support or spacer 17 is installed on cylinder head 11.

On the cylinder head 11, the height of above spacer 17 is sized so as to project from a top of the cylinder head 11 upwardly. In the embodiment, a contact of the spacer 17 with the support part 14B of the injector push arm 14 constitutes a fulcrum X of the injector push arm 14.

The spacer 17 is constituted by a separate member from the cylinder head 11 and fastened to the cylinder head 11 by a cylinder head bolt 18.

Figure 3:
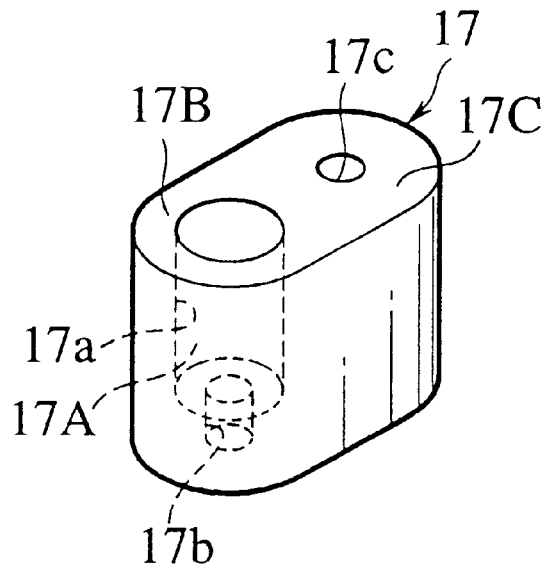
FIG. 3 is a perspective view showing one example of a spacer of the embodiment of the invention.

As shown in FIG. 3, the spacer 17 is generally of a cylindrical shape having a cross section of a generally elongated circle. The spacer 17 is provided, on one end thereof in the longitudinal direction, with a fastening part 17b having a through hole 17A for receiving the cylinder head bolt 18 and provided, on the other end, with an abutment part 17C on which the support part 14B of the injector push arm 14 abuts. The through hole 17A is composed of a large diametrical part 17a on the upper side and a small diametrical part 17b on the lower side.

When assembling, the so constructed spacer 17 is inserted into a recess 11A formed on the top of the cylinder head 11 and then fastened to the cylinder head 11 by the cylinder head bolt 18 inserted into the through hole 17A of the fastening part 17 when mounting cylinder head 11 onto cylinder block 20 by head bolt 18. In this case, the abutment part 17C is offset enough from the axis of the cylinder head bolt and arranged in a position corresponding to a lower face of the support part 14B of the injector push arm 14 so that fastening operation of cylinder head bolt would not be interfaced.

As to the arrangement where the support part 14B of the injector push arm 14 fixed to the cylinder head 11 through the stud bolt 15 abuts on the top of the abutment part 17C of the spacer 17, the abutment face of the injector push arm 14 is curved to constitute a pivot of the arm 14, thereby allowing a fulcrum X to be displaced in fastening the stud bolt 15.

Figure 4:
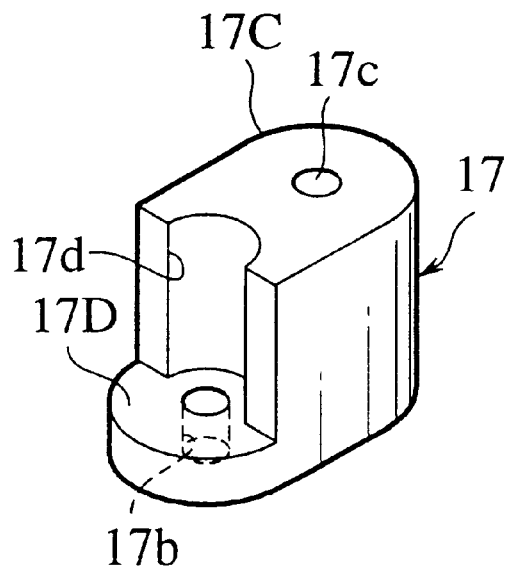
FIG. 4 is a perspective view showing another example of the spacer of the embodiment of the invention.

In the modification, the fastening part 17B of the spacer 17 of FIG. 3 may be replaced with a part having only the small diametrical part 17b, as shown in FIG. 4. In order to form the spacer having such a configuration, a lower end portion on the longitudinal end of the column body of FIG. 3 is only remained as a plate part 17D while the other part is eliminated. In addition, a small diametrical part or hole 17b is formed in the plate part 17D, while a semi-circular cylinder 17d to pass a head of the cylinder head bolt 18 (FIG. 1) is formed above the plate part 17D.

According to the above-mentioned fixing structure for the fuel injector, there can be obtained various features and advantages represented by the following items (1)–(6):

(1) The cylinder head 11 is provided with the spacer 17 which projects from the top of the cylinder head 11. Against the spacer 17, the support part 14B of the injector push arm 14 is brought into contact with the abutment part constituting the fulcrum X of the arm 14. Thus, it is possible to decrease an arm length between the attachment part 14C and the support part 14B, whereby the whole length of the injector push arm 14 can be shortened.

Consequently, the rigidity of the injector push arm 14 can be enhanced. Further, owing to the heightened position of the fulcrum X, it is unlikely that the injector push arm 14 tumbles down to the side of the support part 14B in fastening the stud bolt 15, so that it is possible to develop the pushing force of the push part 14A onto the fuel injector 13.

Especially, in case of the OHC engine of the embodiment where the camshaft 16 is positioned above the cylinder head 11 and the space for accommodating the push arm is restricted, the injector push arm 14 is arranged so as to stride over the camshaft 16. Thus, the fixing structure in accordance with the invention will be more effective in such a case in that both the working (pushing) position of the push part 14A of the injector push arm 14 onto the fuel injector 13 is and the fulcrum point X are positioned at substantially the same height.

(2) Since the spacer 17 is constructed by a member separate or independent from the cylinder head 11 and subsequently fastened to the cylinder head 11 by the cylinder head bolt 18, it is possible to improve the rigidity of the spacer 17 in its attached condition, whereby the supporting of the injector push arm 14 by the spacer 17 can be executed certainly.

(3) The spacer 17 is constructed to have in its elongated direction the fastening part 17B on one end thereof, which is fastened by the cylinder head bolt 18 passing therethrough and the abutment part 17C on the other end, which is in contact with the support part 14B of the injector push arm 14. With the arrangement, the spacer 17 can be fastened to the cylinder head 11 with ease, while the abutment part 17C engaging with the support part 14B of the injector push arm 14 can be formed with ease.

(4) When casting the cylinder head 11, the spacer 17 may be molded integrally with the cylinder head 11. Then, it will be possible to make the fastening operation of the spacer 17 unnecessary, thereby bringing the improvement in productivity.

(5) Since the support part 14B of the injector push arm 14 has the abutment face abutting on the spacer 17, which is curved to provide a pivot, a pivotal movement of the injector push arm 14 during its fastening procedure can be allowed to adjust the position and posture of the injector push arm 14 suitably.

(6) Since the spacer 17 is provided with the positioning pin 19 which projects from the top of the spacer and which is inserted into the hole 14b formed in the support part 14B of the injector push arm 14, positioning of the abutment part 17C of the spacer 17 and the support part 14B of the injector push arm 14 will be facilitated, whereby the arm 14 can be positioned relative to the spacer 17 without difficulty.

Figure 5:
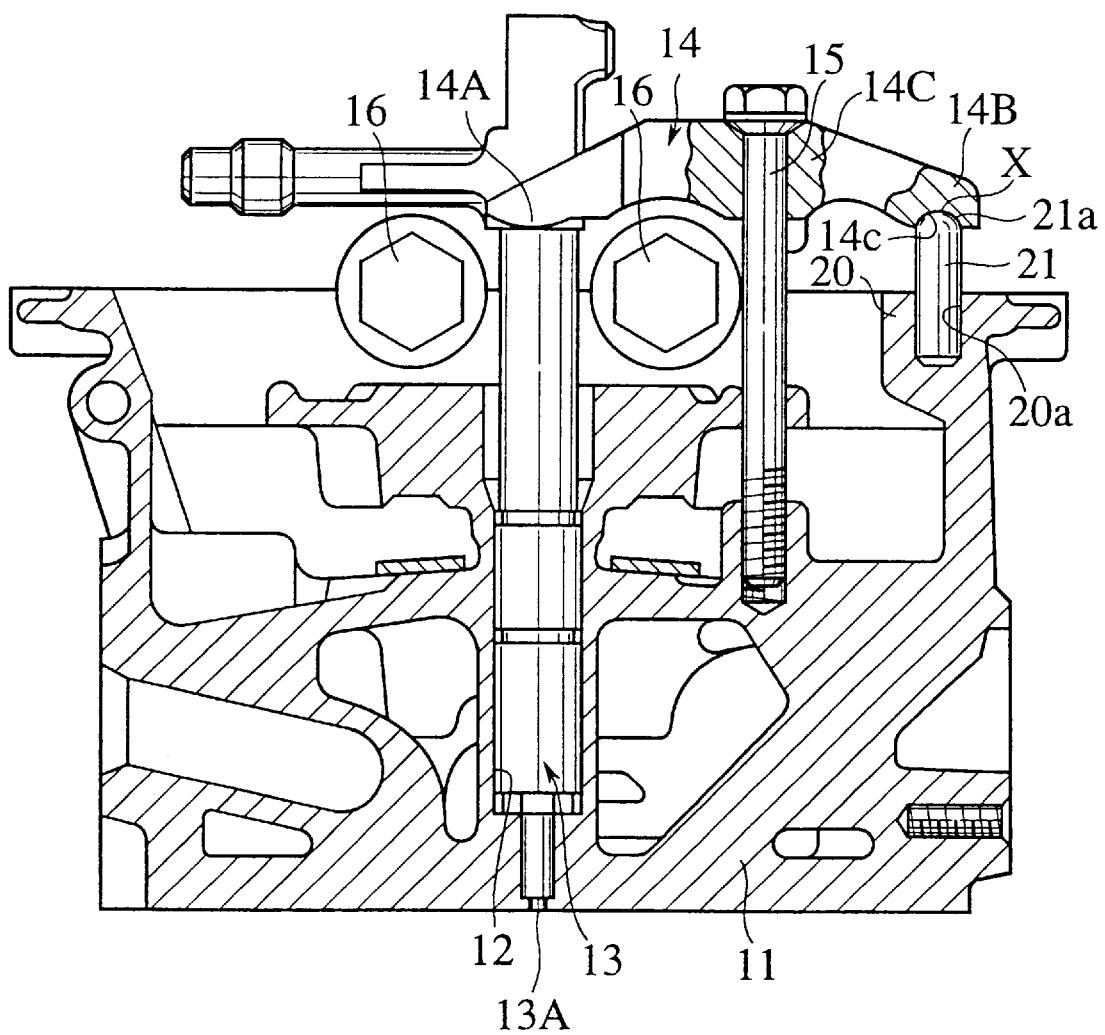
FIG. 5 is a longitudinal cross sectional view of an attachment part of a cylinder head in accordance with another embodiment of the present invention.

Next, referring to FIG. 5, another embodiment of the invention will be described below.

In the embodiment, the cylinder head 11 is provided, on an upper end of a sidewall portion thereof, with an integral support or a base part 20. Base part 20 is preferably formed, as in the case of the previous embodiment, adjacent the head bolt 18 so that a high degree of rigid is assured. Fitted in the base part 20 so as to partially project from a top face thereof is a fulcrum pin 21 which serves to support the support part 14B of the arm 14 from its underside. In the embodiment, the fulcrum X of the injector push arm 14 is constituted by a contact of the fulcrum pin 21 with the support part 14B of the injector push arm 14.

The base part 20 is constituted by a bulky portion of predetermined area and thickness, which can be provided by inwardly expanding a flange portion for a rocker cover attachment at the top of the sidewall of the cylinder head 11. The above-mentioned fulcrum pin 21 is press-fitted into an hole 20a formed on the top of the flange portion.

The injector push arm 14 is provided, on a lower face of the support part 14B, with a semi-spherical recess 14c, while the fulcrum pin 21 is provided, on a top end thereof, with a semi-spherical projection 21a for engagement with the recess 14c, providing a pivotal movement.

Here, in the previously mentioned embodiment, it is possible to decrease an arm length between the attachment part 14C and the support part 14B to generally have the same arm length between the push part 14A and the attachment part. Consequently, the rigidity of the injector push arm 14 can be enhanced. Further, owing to the heightened position of the fulcrum X with the same level of the push part, it is unlikely that the injector push arm 14 tumbles down to the side of the support part 14B while fastening the stud bolt 15, so that it is possible to develop and hold the pushing force of the push part 14A onto the fuel injector 13 to a practically sufficient level.

Again, since the pivot is formed in a position where the support part 14B of the injector push arm 14 abuts on the fulcrum pin 21, it is possible to allow the pivotal movement of the injector push arm 14 when it is being fastened and fixed to the cylinder head 11, whereby the position and posture of the injector push arm 14 can be adjusted suitably.

The fuel injector fixing device of the embodiment operates while the engine is in service as follows.

When the body of the fuel injector 13 is made of iron base alloy and the cylinder head 11 is made of aluminum base alloy, displacement due to the thermal expansions at respective positions of the fuel injector 13, the stud bolt 15 and the fulcrum X will be illustrated in FIG. 6 and explained as follows.

Figure 6:
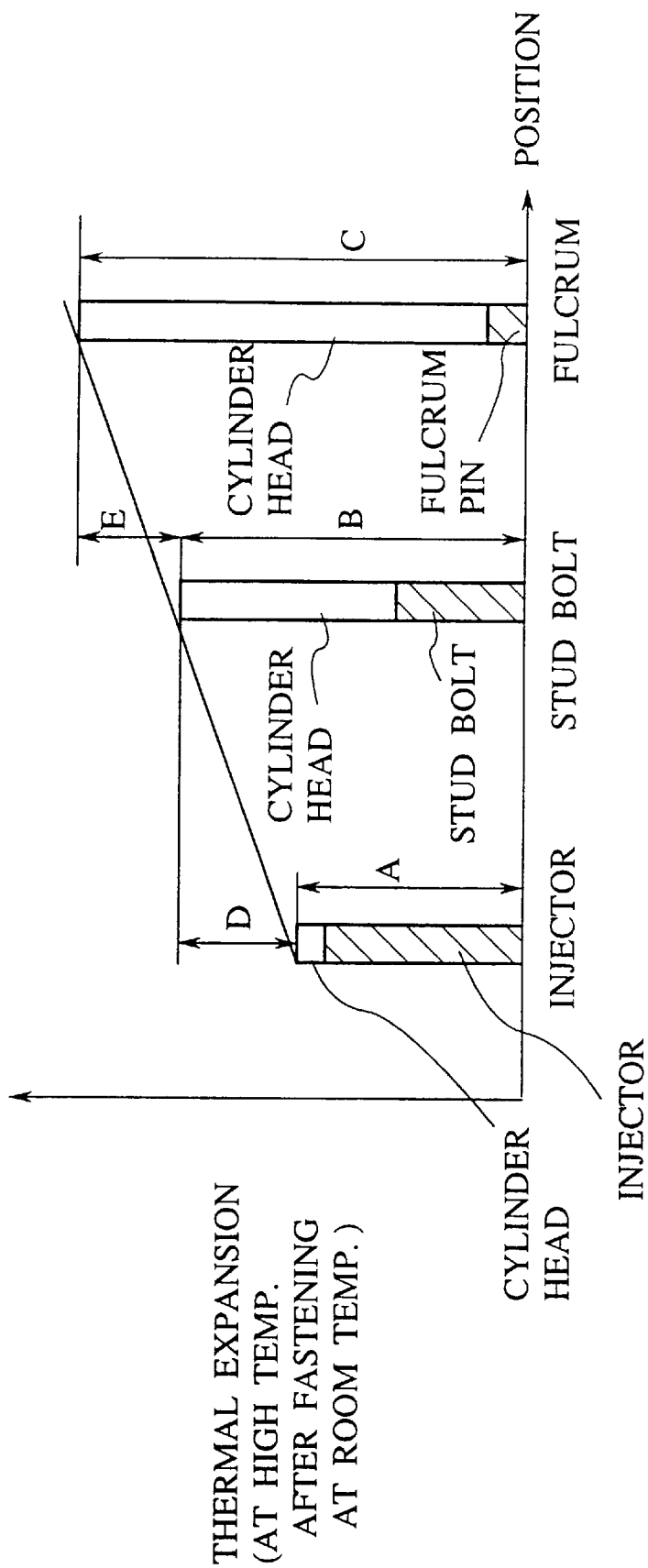
FIG. 6 is a diagram for explanation of an effect brought by the present invention.

That is, at the position of the fuel injector 13, the whole thermal expansion will be shown with (A) of FIG. 6 as sum of a thermal expansion component of the fuel injector 13 of metal of the iron-family and the thermal expansion component of the cylinder head 11 of metal of the aluminum-family.

Next, the whole thermal expansion at the position of the stud bolt 15 will be shown with (B) of FIG. 6 as sum of the thermal expansion component of the stud bolt 15 of metal of the iron-family and the thermal expansion component of the cylinder head 11 of metal of the aluminum-family.

Finally, the whole thermal expansion at the position of the fulcrum X will be shown with (C) of FIG. 6 as a total of the thermal expansion component of the injector push arm 14 of metal of the iron-family and the thermal expansion component of the cylinder head 11 of metal of the aluminum-family.

Consequently, a difference of (D) of FIG. 6 is produced between the thermal expansion at the position of the fuel injector 13 and the thermal expansions at the stud bolt position, while a difference of E is produced between the thermal expansion at the position of the stud bolt 15 and that at the fulcrum X.

Thus, according to the embodiment, the difference (D) between the position of the fuel injector 13 and that of stud bolt 15 (i.e. a downward displacement of the injector 12 from a level of the stud bolt 15) will be adjusted or compensated for the latter difference E between the position of the stud bolt 15 and the position of the fulcrum X (i.e. a upward displacement of the fulcrum X from the level of the bolt 15). It is therefore possible to keep the injector push arm in intimate operative contact with the injector looseness in the condition where the fuel injector 13 is held effectively by the push part 14A of the injector push arm 14.

Accordingly, it is possible to prevent the pushing force and the sealing pressure, which is exerted by the seal member disposed between the fuel injector 13 and the cylinder head 11, from being decreased, whereby the sealing capability can be improved.

Note, by adjusting the length of the support pin 21, it is possible to adjust the thermal expansion component at the position of the fulcrum X, whereby it is possible to carry out the adjustment of sealing force of the sealing member between the fuel injector 14 and the cylinder head 11.

Finally, it will be understood by those skilled in the art that the foregoing description is preferred embodiments of the disclosed fuel injector fixing device, and that various changes and modifications may be made to the present invention without departing from the spirit and scope thereof.

INDUSTRIAL APPLICABILITY

As mentioned above, according to the present invention, the rigidity of the injector push arm can be enhanced. Further, owing to the heightened position of the fulcrum, it is possible to reduce the possibility of the injector push arm's tumbling down to the side of the support part in fastening the stud bolt, so that it is possible to develop the pushing force of the push part onto the fuel injector.

Especially, in case of the OHC engine of the embodiment where the camshaft is positioned above the cylinder head, the injector push arm is arranged so as to stride over the camshaft. Thus, the fixing structure in accordance with the invention will be more effective in such a case that the working (pushing) position of the push part of the injector push arm onto the fuel injector is generally in the same level as the fulcrum pin. Further, it is possible to prevent the reduction of sealing pressure of the sealing member, which is derived from the differences in thermal expansion among the respective parts, whereby the sealing capability can be improved.

Further in case that the cylinder head is made of aluminum base alloy while the body of the fuel injector and the stud bolt are made of an iron base alloy, the differences in thermal expansion among the respective parts are cooperative to effectively hold the injection in place.

In addition, when the spacer is constituted by a separate member from the cylinder head and fastened to the cylinder head by a cylinder head bolt, it is possible to support the injector push arm by the spacer securely.

Further, when the spacer is constituted by a fastening part which is arranged in plan view at one end of the spacer and into which the cylinder head bolt is inserted, and an abutment part which is arranged at the other end of the spacer and on which the support part of the injector push arm abuts, the spacer can be fastened to the cylinder head with ease, while the abutment part engaging with the support part of the injector push arm can be formed with ease.

When the spacer is originally constituted by a separate member from the cylinder head and then cast integral with the cylinder head, the productivity of the spacer can be improved.

Further, when the support part of the injector push arm is provided with a curved abutment face abutting on the spacer to provide a pivot, it is possible to adjust the position and posture of the injector push arm properly.

When the spacer is provided with a positioning pin which projects from the top of the spacer upwardly and which is inserted into a hole formed in the support part of the injector push arm, it is possible to carry out the positioning of the injector push arm precisely.

Furthermore, providing that the fuel injector fixing device includes a base part formed on an upper end of a sidewall portion of the cylinder head and a fulcrum pin fitted in the base part so as to partially project from a top face of the base part while a contact of the fulcrum pin with the fuel injector constitutes a fulcrum of the injector push arm and that the support part of the injector push arm and the fulcrum pin have respective abutment surfaces which come into contact with each other and which are curved to provide a pivot, it is possible to adjust the position and posture of the injector push arm properly.

We claim:

1. A fuel injector fixing device for fixing a fuel injector which has a fuel injection nozzle at a leading end thereof to a cylinder head of a direct injection engine, said fuel injector fixing device comprising:

a spacer arranged so as to project upwardly from an upper surface of said cylinder head;

a stud bolt screwed into said cylinder head; and an injector push arm secured to said cylinder head by said stud bolt;

wherein said injector push arm comprises:

a pusher part at a first end of said injector push arm, said pusher part having an injector contact point that abuts said fuel injector;

a support part at a second end of said injector push arm, said support part having a spacer contact point that abuts said spacer; and an attachment part arranged between said pusher part and said support part, having a through hole for inserting said stud bolt;

wherein contact between the injector contact point of said pusher part and said fuel injector constitutes a working point of said injector push arm, while contact between the spacer contact point of said support part and said spacer constitutes a fulcrum of said injector push arm; and wherein said direct injection engine comprises an overhead cam shaft engine having at least one camshaft and said injector push arm is arranged above said cylinder head so as to extend over said camshaft.

2. A fuel injector fixing device as claimed in claim 1, wherein said spacer is a member which is separate from said cylinder head and fastened to said cylinder head by a cylinder head bolt.

3. A fuel injector fixing device as claimed in claim 2, wherein said spacer comprises a fastening part which is arranged at one end of said spacer and into which said cylinder head bolt is inserted, and an abutment part which is arranged at the other end of said spacer and on which said support part of said injector abuts.

4. A fuel injector fixing device as claimed in claim 2, wherein said contact of said support part of said injector push arm with said spacer is positioned in a neighborhood of a center line of said cylinder head bolt.

5. A fuel injector fixing device as claimed in claim 1, wherein said spacer is a member unitarily formed with said cylinder head by casting.

6. A fuel injector fixing device as claimed in claim 1, wherein the support part at the second end of said injector push arm has a curved abutment face abutting said spacer so as to provide a pivot between the second end of the injector push arm and said spacer.

7. A fuel injector fixing device as claimed in claim 1, wherein said spacer is provided with a positioning pin which projects from said top of said spacer upwardly and which is inserted into a hole formed in said support part of said injector push arm.

8. A fuel injector fixing device as claimed in claim 1, wherein said cylinder head and said spacer are made of metal or alloy of aluminum-base, while a body of said fuel injector, said injector push arm, and said stud bolt are made of metal or alloy of iron-base.

9. A fuel injector fixing device for fixing a fuel injector which has a fuel injection nozzle at a leading end thereof to a cylinder head of a direct injection engine, said fuel injector fixing device comprising:

a base part formed on an upper end of a sidewall portion of the cylinder head;

a fulcrum pin fitted in said base part so as to project above said base part;

a stud bolt screwed into said cylinder head; and an injector push arm for fixing said fuel injector to said cylinder head, said injector push arm being arranged above the cylinder head and consisting of a pusher part at a first end of said injector push arm so as to abut said fuel injector, a support part at a second end of said injector push arm so as to abut said fulcrum pin, and an attachment part between the pusher part and the support part, the attachment part being provided with a hole in which said stud bolt is is received;

wherein contact between said fulcrum pin and the pusher part constitutes a fulcrum of said injector push arm; and wherein said support part of said injector push arm and said fulcrum pin respectively have curved abutment surfaces which contact each other to define a pivot.

10. A fuel injector fixing device as claimed in claim 9, wherein said cylinder head is made of metal of aluminum-family, while a body of said fuel injector, said injector push arm, and said stud bolt are made of metal of iron-family, respectively.

11. A fuel injector fixing device for fixing a fuel injector having a fuel injection nozzle at a leading end thereof to a cylinder head of a direct injection engine, said fuel injector fixing device comprising:

a base part formed on an upper end of a sidewall portion of the cylinder head;
a fulcrum pin fitted in said base part so as to project up from said base part;
a stud bolt screwed into said cylinder head; and
an injector push arm for fixing said fuel injector to said cylinder head, said being arranged above the cylinder head and consisting of a pusher part which is arranged at a first end of said injector push arm so as to abut an end of said fuel injector opposite to said fuel injection nozzle, a support part which is arranged at the other end of said injector push arm so as to abut on said fulcrum pin, and an attachment part which is arranged between said pusher part and said support part, said attachment part being provided with a hole in which said stud bolt is received;
wherein contact between said fulcrum pin and the support part of said injector push arm constitutes a fulcrum of said injector push arm;
wherein said direct injection engine is an overhead cam shaft engine having at least one camshaft and wherein said injector push arm is arranged on said cylinder head so as to extend over said camshaft.

12. A cylinder head assembly for a direct injection engine, comprising:

a cylinder head having a plurality of fuel injectors disposed therein; and
a plurality of fuel injector fixing devices for fixing said fuel injectors to said cylinder head;
wherein each of said fuel injector fixing device comprises:
a base part integrally formed on an upper end of a sidewall portion of said cylinder head;
a fulcrum pin fitted in said base part so as to project out from said base part;
a stud bolt screwed into said cylinder head; and
an injector push arm arranged above said cylinder head, said injector push arm fixing said fuel injector to said cylinder head and consisting of a pusher part which is arranged at a first end of said injector push arm so as to abut said fuel injector, a support part which is arranged at a second end of said injector push arm so as to abut said fulcrum pin, and an attachment part between the pusher part and the support part, the attachment part being provided with a hole in which said stud bolt is received;
wherein contact of said fulcrum pin with the second end of said fuel injector push arm constitutes a fulcrum point of said injector push arm; and
wherein said direct injection engine is an overhead cam shaft engine having at least one camshaft wherein said injector push arm is arranged above said cylinder head so as to extend over said camshaft.

13. A cylinder head assembly as claimed in claim 12, wherein said engine is a Diesel engine.

14. A cylinder head assembly as claimed in claim 12, wherein said fulcrum pin is positioned adjacent a cylinder head bolt without interfacing therewith.

15. A cylinder head assembly as claimed in claim 12, wherein said base part is formed integral with a flange for mounting a rocker cover thereon.

16. A fuel injector fixing device as claimed in claim 1, wherein the fuel injector injection nozzle opens into a cylinder which is in part defined by the cylinder head.

17. A fuel injector fixing device as claimed in claim 10, wherein the fuel injector injection nozzle opens into a cylinder which is in part defined by the cylinder head.

18. A fuel injector fixing device as claimed in claim 11, wherein the fuel injector injection nozzle opens into a cylinder which is in part defined by the cylinder head.

19. A fuel injector fixing device for a direct injection engine having a fuel injector fixed on a cylinder head, said fuel injector fixing device comprising:

a spacer arranged so as to project out from the cylinder head;
a stud bolt threadedly received in the cylinder head; and
an injector push arm arranged above said cylinder head and connected thereto by said stud bolt;
wherein said injector push arm comprises:
a pusher portion arranged at a first end of said injector push arm for abutting a portion of the fuel injector, said pusher portion having an injector contact point in contact with the fuel injector;
a support portion arranged at a second end of said injector push arm, said support portion abutting on said spacer and having a spacer contact point in contact with said spacer; and
an attachment portion located between said pusher part and said support part, said attachment portion having a hole which receives said stud bolt; and
wherein said injector contact point and said spacer contact point are located substantially on the same flat plane which is essentially normal to said stud bolt and wherein said spacer contact point constitutes a fulcrum point of said injector push arm.

20. A fuel injector fixing device as claimed in claim 19, wherein said injector push arm further includes a load point and a work point.

21. A fuel injector fixing device as claimed in claim 20, wherein said work point is defined by the contact between the pusher portion and the fuel injector.

22. A fuel injector fixing device as claimed in claim 20, wherein said load point is defined by contact between said stud bolt and the attachment portion.

23. A fuel injector fixing device as claimed in claim 19, wherein the spacer contact point of said injector push arm has a curved surface which abuts against said spacer.

24. A fuel injector fixing device as claimed in claim 19, wherein the injector contact point of said injector push arm has a curved surface which abuts against the fuel injector.

25. A fuel injector fixing device for a direct injection engine having a fuel injector fixed on a cylinder head, said fuel injector fixing device comprising:

a spacer arranged so as to project from the cylinder head;
a stud bolt threadedly received in the cylinder head; and
an injector push arm arranged above said cylinder head and connected to the cylinder head by said stud bolt;
wherein said injector push arm comprises:
a pusher portion arranged at a first end of said injector push arm which abuts the fuel injector to establish an injector contact point;

a support portion arranged at a second end of said injector push arm which abuts against said spacer to establish a spacer contact point; and an attachment portion arranged between the pusher portion and the support portion, having a hole for receiving said stud bolt;

wherein said spacer contact point constitutes a fulcrum of said injector push arm;

wherein said direct injection engine has an overhead camshaft; and wherein said injector push arm is arranged above said cylinder head so as to extend over said camshaft.

26. A fuel injector fixing device for a direct injection engine having a fuel injector fixed on a cylinder head, said fuel injector fixing device comprising:

a spacer arranged so as to project from the cylinder head;

a stud bolt threadedly received in the cylinder head; and an injector push arm arranged above said cylinder head and connected to the cylinder head by said stud bolt;

wherein said injector push arm comprises:

a pusher portion arranged at a first end of said injector push arm which abuts the fuel injector to establish an injector contact point;

a support portion arranged at a second end of said injector push arm which abuts against said spacer to establish a spacer contact point; and an attachment portion arranged between the pusher portion and the support portion, having a hole for receiving said stud bolt;

wherein said spacer contact point constitutes a fulcrum of said injector push arm;

wherein said injector contact point and said fulcrum pin contact point are located on a plane which is essentially normal to said stud bolt; and wherein the spacer contact point constitutes a fulcrum of said injector push arm.

* * * * *